Feb. 6, 1923.
J. MAILLOUX.
POTATO CHECKROW PLANTER.
FILED MAR. 16, 1921.
1,444,127.
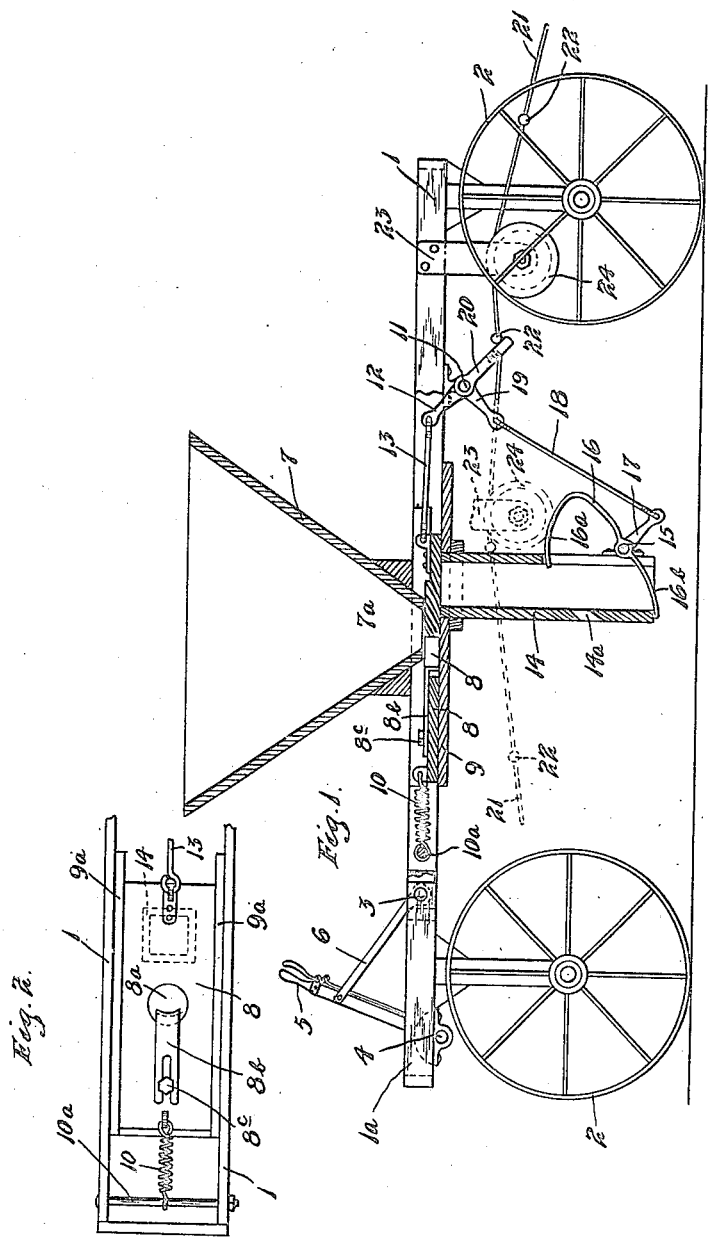
INVENTOR.
JOHN MAILLOUX.
BY HIS ATTORNEY.
James F. Williamson Patented Feb. 6, 1923.

1,444,127

UNITED STATES PATENT OFFICE.

JOHN MAILLOUX, OF McINTOSH, MINNESOTA.

POTATO CHECKROW PLANTER.

Application filed March 16, 1921. Serial No. 452,315.

*To all whom it may concern:*

Be it known that I, JOHN MAILLOUX, a citizen of the United States, residing at McIntosh, in the county of Polk and State of Minnesota, have invented certain new and useful Improvements in Potato Checkrow Planters; and I do hereby declare the following to be a full, clear, and exact description of the invention, such as will enable others skilled in the art to which it appertains to make and use the same.

This invention relates to a planting machine, and particularly to such a machine designed to plant potatoes.

It is an object of this invention to provide such a machine in which potatoes will be carried in a hopper and can be fed therefrom in regulated quantities and be deposited in the planting furrows.

It is a further object of the invention to provide a delivery chute or spout communicating with the feeding means of the hopper, which chute is provided with a double oscillatory valve, which, in the operation of the machine, acts as a carrying bottom for the chute and also as a delivery means.

It is a further object of the invention to arrange the planter to be driven by the usual check row wire or cable, although, if desired, other means may be used for operating the feeding mechanism. These and other objects and advantages of the invention will be apparent from the following description made in connection with the accompanying drawings, in which—

Fig. 1 is a view in side elevation of the device, a large part thereof being shown as a central longitudinal section; and Fig. 2 is a partial plan view of the feeding means.

Referring to the drawings, the machine is shown as having a frame 1 which can be of any desired suitable construction and which is supported upon truck wheels 2. The rear part of the frame is divided and joined by a transversely extending pivot 3, the portion to the rear of the pivot being designated as 1ª, and an elevated shaft or rod 4 extends transversely across the rear portion of the frame. This shaft has a lever 5 secured thereto from which a pair of strap or supporting members 5ª extend to the rear portion of the front pivoted section of the frame. The lever 5 will preferably be provided with the usual toothed quadrant and handle operated pawl for engaging the same to hold the lever in any adjusted position.

The front portion of the frame is provided with transversely extended blocks or members in which is carried a hopper member 7 adapted to receive and carry the potatoes or the cut portions thereof which are to be planted. A slide 8 is arranged for reciprocation immediately under the hopper and has formed therein an opening 8ª. The opening 8ª is arranged to co-operate with the opening 7ª in the bottom of the hopper 7. An auxiliary slide 8ᵇ is provided on the slide 8 and has its front end formed of arcuate shape. This slide is adapted to be moved more or less across the opening 8ª and in order to be held in its various adjusted positions, is provided with a slot in its rear end through which a screw 8ᶜ extends into the slide 8. By tightening or loosening this screw the slide 8ᵇ can be moved to close more or less of the opening 8ª. The slide 8 is supported upon the platform 9 and moves between the guide portions 9ª at the sides thereof. This slide is connected at its rear end to a spring 10 which has its other end connected to a rod or bar 11 extending between the members 9ª.

At the front of the machine, and at each side thereof are arranged depending brackets supported on the underside of the frame members which carry a transversely extending shaft 11 which is rotatably mounted therein. The arm 12 is rigidly connected to this shaft and, at its outer end, is connected by a rod or link 13 with the front end of the slide member 8. A chute or spout 14 depends from the platform 9 and is secured thereto in any suitable manner, and at its lower front side is provided with bearings to sustain an oscillatory shaft 15. A double wing valve member 16 having an upper wing 16ª and lower wing 16ᵇ is secured to the shaft 15. The wing 16ª is adapted to swing across the chute when the shaft is oscillated and the chute is provided with a slot 14ª in its rear portion into which the end of the wing 16ª enters. The wing 16ᵇ is adapted to swing into position to close the bottom of the hopper or to open the same as the shaft 15 is oscillated. An arm 17 is rigidly secured to shaft 15 and extends forwardly therefrom. This arm is connected at its outer end by a link 18 to a similar arm 19, which is rigidly secured to the shaft 11 and extends downwardly and rearwardly therefrom. The outer end of the shaft 11 is provided with members 20 which are bifurcated or forked at their outer ends to receive the ordinary check row wire or cable 21 which is provided at spaced intervals with the customary knots or enlarged portions 22. The side of the frame has brackets 23 depending therefrom at the lower end of which are secured the grooved sheaves 24, over which the cable 21 is adapted to pass and by which it is supported in operative relation to the member 20.

The operation of the device is as follows:

By moving the lever 5, the front part 1 of the frame can be raised or lowered and the lower part of the chute 14 brought into the desired relation to the ground or furrow therein. The potatoes will be placed in hopper 7, and as the machine travels across the field, the fork member 20 will be oscillated by the cable 21 moving therein and the enlargement 22 thereof striking the sides of the fork and moving the same rearwardly. This movement will draw the slide 8 forwardly and potatoes will drop from the bottom of the upper part of the opening 8ª. As the slide moves forward, this opening will come into registration with the opening in the top of the chute 14 and the potatoes will drop thereinto. As the shaft 11 is oscillated by the arm 20, the member 16ª will swing across the chute 14 so that when the potatoes drop into the chute the same will be supported upon said member. When the slide $a$ is thus drawn forward, the spring 10 is placed under tension. The enlargement 22 will move the arm 20 rearwardly and will then slip off from the fork at the end thereof when the same is swung to point toward the rear. When these members 22 are disengaged from the fork, the spring 10 will retract the slide 8. The portion 16ª of the valve 16 will then be moved substantially to the position shown in Fig. 1 and the potatoes in the chute will drop onto member 16ᵇ. When the next enlargement 22 contacts with the member 20, to repeat the above described operation, the member 16ᵇ will be oscillated away from the bottom of the hopper and the potatoes supported thereby will be delivered and deposited in the furrow. The opening 8ª is adjusted so that different numbers of potatoes or pieces thereof can be received therein.

From the above description it is seen that applicant has produced a simple and efficient planter and one having relatively few parts, which parts can be simply and ruggedly made. The machine is largely automatic in its action and requires the attendance of but one person.

It will, of course, be understood that various changes may be made in the form, details and arrangement of the parts without departing from the scope of applicant's invention, which, generally stated consists in the matter shown and described and set forth in the appended claim.

What is claimed is:

A potato planter comprising a frame, a hopper supported thereby, a delivery chute supported by and depending from the frame, a double curved wing valve pivoted near the lower end of the chute, one curved portion of which co-operates with the lower end of the chute and the other curved portion of which reciprocates therethrough intermediate the length thereof, an operating arm connected to said valve, a link connected to said arm, a reciprocating slide mounted to reciprocate beneath said hopper and having an opening therein cooperating with an opening in the bottom of the hopper and the upper end of the delivery chute, a link connected directly to said slide, a rock shaft having radiating arms connected thereto, two of said arms being connected, respectively, to said links to positively connect with and operate the slide and valve, and the third arm being formed as a fork adapted to receive a check row cable, and resilient means for reversely moving said slide, valve and rock shaft.

In testimony whereof I affix my signature in presence of two witnesses.

JOHN MAILLOUX.

Witnesses:
INGEMAN AASENG,
GEO. A. BEIT.